United States Patent
Horton et al.

(10) Patent No.: US 7,657,873 B2
(45) Date of Patent: Feb. 2, 2010

(54) VISUALIZER SYSTEM AND METHODS FOR DEBUG ENVIRONMENT

(75) Inventors: Anson Horton, Sammamish, WA (US);
Michael Montwill, Seattle, WA (US);
Lucas J. Hoban, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 10/834,634

(22) Filed: Apr. 29, 2004

(65) Prior Publication Data

US 2005/0246690 A1   Nov. 3, 2005

(51) Int. Cl.
*G06F 9/44* (2006.01)
(52) U.S. Cl. .................... 717/125; 717/105; 717/109; 717/113; 717/124
(58) Field of Classification Search .................. 717/125
See application file for complete search history.

(56) References Cited

U.S. PATENT DOCUMENTS

| | | | |
|---|---|---|---|
| 5,706,411 A | 1/1998 | McCormick et al. | |
| 5,977,966 A | 11/1999 | Bogdan | |
| 6,011,920 A | 1/2000 | Edwards et al. | |
| 6,557,011 B1 | 4/2003 | Sevitsky et al. | |
| 6,961,924 B2 * | 11/2005 | Bates et al. | 717/125 |
| 7,051,015 B1 * | 5/2006 | Street et al. | 707/3 |
| 7,139,811 B2 * | 11/2006 | Lev Ran et al. | 709/217 |
| 7,251,808 B2 * | 7/2007 | Bates et al. | 717/125 |
| 2002/0087953 A1 * | 7/2002 | Hines | 717/125 |
| 2003/0131342 A1 * | 7/2003 | Bates et al. | 717/125 |
| 2003/0188296 A1 * | 10/2003 | Bates et al. | 717/130 |
| 2004/0230954 A1 * | 11/2004 | Dandoy | 717/124 |
| 2005/0071813 A1 * | 3/2005 | Reimer et al. | 717/125 |

OTHER PUBLICATIONS

Nicol et al., "Platform Independent UI Objects Bringing 'XSL Beans' to thw World", 1998, eBusiness Technologies, pp. 1-24.*
M. Williams, ".NET Serialization", 2001, codeguru, pp. 1-8.*
Lee et al., "VisOK: A Flexible Visualization System for Distributed Java Object Application", 2000 IEEE, pp. 1-6.*
Gestwicki et al., "Interactive Visualization of Java Programs", 2002, IEEE, HCC'02, pp. 1-10.*
M. Cameron, et al., ViMer: A Visual Debugger for Mercury, PPDP'03, Aug. 27-29, 2003, pp. 56-66, Uppsala, Sweden.
Chyi-Ren Dow, et al., A Visualization System for Parallelizing Programs, Proceedings of the 1992 ACM/IEEE conference on Supercomputing, 1992, pp. 194-203, Minneapolis, Minnesota, USA.

(Continued)

*Primary Examiner*—Michael J Yigdall
*Assistant Examiner*—Ben C Wang
(74) *Attorney, Agent, or Firm*—Workman Nydegger

(57) ABSTRACT

The present invention provides an extensible mechanism for displaying object data in a debug environment in a suitable display format. In one aspect, a system is provided for computerized debug environments. The system includes a display component that presents data at a debug interface, wherein the data is associated with a first representation in a debug object and as at least a second representation at the debug interface. A communications component transmits the data from the debug object to the display component and also transforms the data from the first representation to the second representation.

15 Claims, 10 Drawing Sheets

OTHER PUBLICATIONS

T. Dean Hendrix, et al. An Extensible Framework for Providing Dynamic Data Structure Visualizations in a Lightweight IDE. SIGCSE'04, Mar. 3-7, 2004, Norfolk, Virginia. 2004 ACM.

James H. Cross II, et al. Software Visualization and Measurement in Software Engineering Education: An Experience Report. 29th ASEE/IEEE Frontiers in Education Conference. Nov. 10-13, 1999 San Juan, Puerto Rico.

Larry A. Barowski, et al. Extraction and Use of Class Dependency Information for Java. Proceedings of the Ninth Working Conference on Reverse Engineering (WCRE'02). 2002.

James H. Cross II, et al. Using the Debugger as an Integral Part of Teaching CS1. 32nd ASEE/IEEE Frontiers in Education Conference. Nov. 6-9, 2002. Boston, MA, USA.

T. Dean Hendrix, et al. Visual Support for Incremental Abstraction and Refinement in Ada 95. BIGAda '98. Washington, D.C., USA. 1998.

James H. Cross II, et al. Scalable Visualizations to Support Reverse Engineering: A Framework for Evaluation. 1998 IEEE.

T. Dean Hendrix, et al. Tool Support for Reverse Engineering Multi-Lingual Software. 1997 IEEE.

* cited by examiner

VISUALIZER SYSTEM AND METHODS FOR DEBUG ENVIRONMENT

TECHNICAL FIELD

The present invention relates generally to systems and methods that facilitate code development activities, and more particularly, the present invention relates to a display and communications system and method that cooperate to present data in a desired format in a code-debugging environment.

BACKGROUND OF THE INVENTION

Perhaps the single most important feature of the modem day Graphical User Interface (GUI) debugger is its ability to display runtime object data to a developer in a very simple and meaningful way. As such, it is important that when the debugger displays this information, it displays it in such a way that the values which developers are most interested in are displayed prominently. Unfortunately, it is not possible for any debugger to analyze arbitrary objects to determine what the developer is actually interested in knowing. This can lead to significant issues in debugging large complicated objects. In particular, debugging objects having data that cannot be represented in a hierarchical manner, for example the nature of is instead relational or perhaps even visual, is quite difficult.

Consider, in one example, a bitmap object that contains information about its size, bits per pixel, and so forth. This information is usually easily accessible through a hierarchical view (e.g., standard view of typed data as a tree structure); however, it is generally not possible for the developer to get an understanding of what the image looks like by merely observing the binary data. However, a bitmap likely has other representations (e.g., image of an eagle rather than ones and zeros display) that would likely provide the developer much more information then with the traditional representation of the bitmap. As can be appreciated, visualization problems can be found with other types of data formats in addition to bitmaps (e.g., string representations of data, data sets, relational databases, XML, and so forth).

Continuing with the bitmap example above—such as from a bitmap that is part of a tree structure view, when developers expand the bitmap they are presented with a confusing binary representation of the data. At best, the developer or user may be able to determine the dimensions of the bitmap which they are viewing, but it's very unlikely that they will be able to determine what the bitmap actually looks like. A second and perhaps even more compelling example is the view given to structured database language while debugging. In particular, it is virtually impossible for the developer to actually understand what information is stored in the respective tables of a data set.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate presentation of a desired data format in a code development and debug environment. In one aspect, a display component and a communications component are provided to display and transform data originating in one format at an object under debug to a subsequent display format at a debugging interface that interacts with the object. In this manner, object data under debug (e.g., strings, XML, binary data, data sets, relational data, and so forth) is presented in a manner that is more useful to developers than merely displaying value representations of the data. For example, a bitmap image may actually represent a visual image of some object (e.g., image of an automobile). Merely displaying a binary representation of such image may have limited utility for a code developer attempting to integrate the image within the confines of another application. The present invention associates the communications component with a debug object and the display component with an application debugger. The components then communicate to transform one representation of object data at the debug object to another representation at the debugger. In this manner, data is presented in a display format that is highly relevant and more suitable for the developer interacting and designing with such objects.

One aspect of debugger visualizers adapted in accordance with the present invention is that they allow component developers (i.e., any person developing a piece of reusable code) to define the manner in which other developers will interact with their component (or components) at debug time. By providing visual representations of data in a meaningful and extensible manner, component providers are given the freedom for defining the debug time presentation of their components in a suitable and desired format.

With respect to a bitmap or other data representations, a design-time representation would likely provide the developer more information than they can glean from conventional expansions of the bitmap. In particular, design-time representations of the bitmap or other data types generally will visually show what the bitmap contains. Given that developers spend a large majority of their time in a debugger system or interface, it is reasonable that they can and should expect that the experience be as rich (or much richer) then the experience they have at design-time since the debugger generally has more data regarding the program than the design time environment generally provides. In one aspect of the invention, a debugger visualizer can be provided which displays the image visually. The visualizer can then be associated with the bitmap or other data representation.

One of the most difficult aspects of devising an extensible mechanism for custom viewers in the debugger is defining the communication mechanism between the debugger and the object being debugged. For type visualizers, a debugger can be provided for a given language and can be responsible for facilitating communications. The developer designing the visualizer should provide components for passing information between the visualizer and the communications component, through an interface defined by the expression evaluator or other communications engine. In general, the object under debug and the visualizer can communicate through streams, in one example, which can be used to hold a serialized display of the object from the object under debug. It is noted that the visualizer can be loaded and run in the debugger's process, while the code which serializes the information to pass to the visualizer can reside in the object under debug.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become appar-

DETAILED DESCRIPTION OF THE INVENTION

The present invention provides an extensible mechanism for displaying object data in a debug environment in a suitable display format. In one aspect, a system is provided for computerized debug environments. The system includes a display component that presents data at a debug interface, wherein the data is associated with a first representation in a debug object and as at least a second representation at the debug interface. For example, binary object data can be displayed as a visual image at the debug interface rather than displaying the mere values or other construct of the object data. A communications component transmits the data from the debug object to the display component and also transforms the data from the first representation to the second representation.

As used in this application, the terms "component," "model," "system," "visualizer," "object," "serializer," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
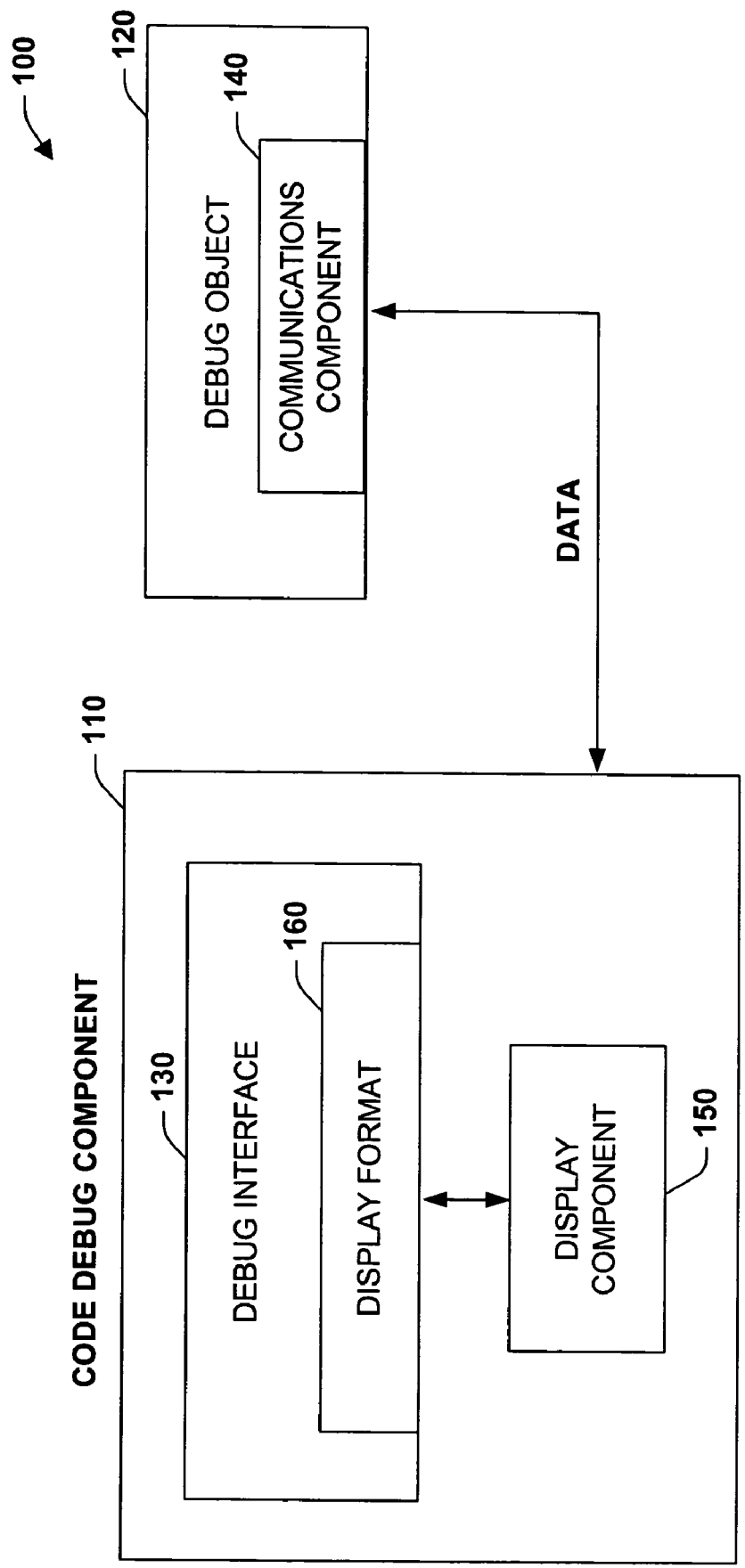
FIG. 1 is a schematic block diagram illustrating a code debug system in accordance with an aspect of the present invention.

Referring initially to FIG. 1, a code debug system 100 is illustrated in accordance with an aspect of the present invention. The system 100 includes a code debug component 110 (e.g., Visual Studio or other development system) that interacts and communicates with a debug object 120. The code debug component 110 includes a debug interface 130 for displaying and interacting with data from the debug object. A communications component 140 is provided with the debug object 120 to transmit object data to the code debug component 110. A display component 150 receives the data and displays or visualizes the data at the debug interface 130 according to a desired display format 160. It is noted that the communications component 140 and the display component 150 are generally supplied by the debug object 120, wherein the display component is loaded from the object on to the code debug component 110. However, it is to be appreciated that these components can be provided separately and in many different forms (e.g., communications component loaded from the code debug system to the debug object, the display component operating from the code debug object and so forth).

The display format 160 is generally in accord with a desired viewing arrangement for the data being received from the debug object 120. In general, the display component 150 and the communications component 140 are provided to display and transform data originating in one format at the debug object 120 to a subsequent display format at the debug interface 130. In this manner, object data under debug (e.g., strings, XML, binary data, and so forth) is presented in a manner that is more useful to developers than merely displaying value representations of the data at the debug interface 130. For example, a bitmap image may actually represent a visual image of some object (e.g., image of a person). Merely displaying a binary representation of such image may have limited utility for a code developer attempting to integrate the image within the confines of another application being debugged at the code debug component 110.

It is noted that the debug interface 130 and associated display format 160 can be provided as a Graphical User Interface (GUI). For example, the interface 130 can include one or more display objects (e.g., icon) that can include such aspects as configurable icons, buttons, sliders, input boxes, selection options, menus, tabs and so forth having multiple configurable dimensions, shapes, colors, text, data and sounds to facilitate operations with the systems described herein. In addition, the user inputs can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the various components described herein.

Figure 2:
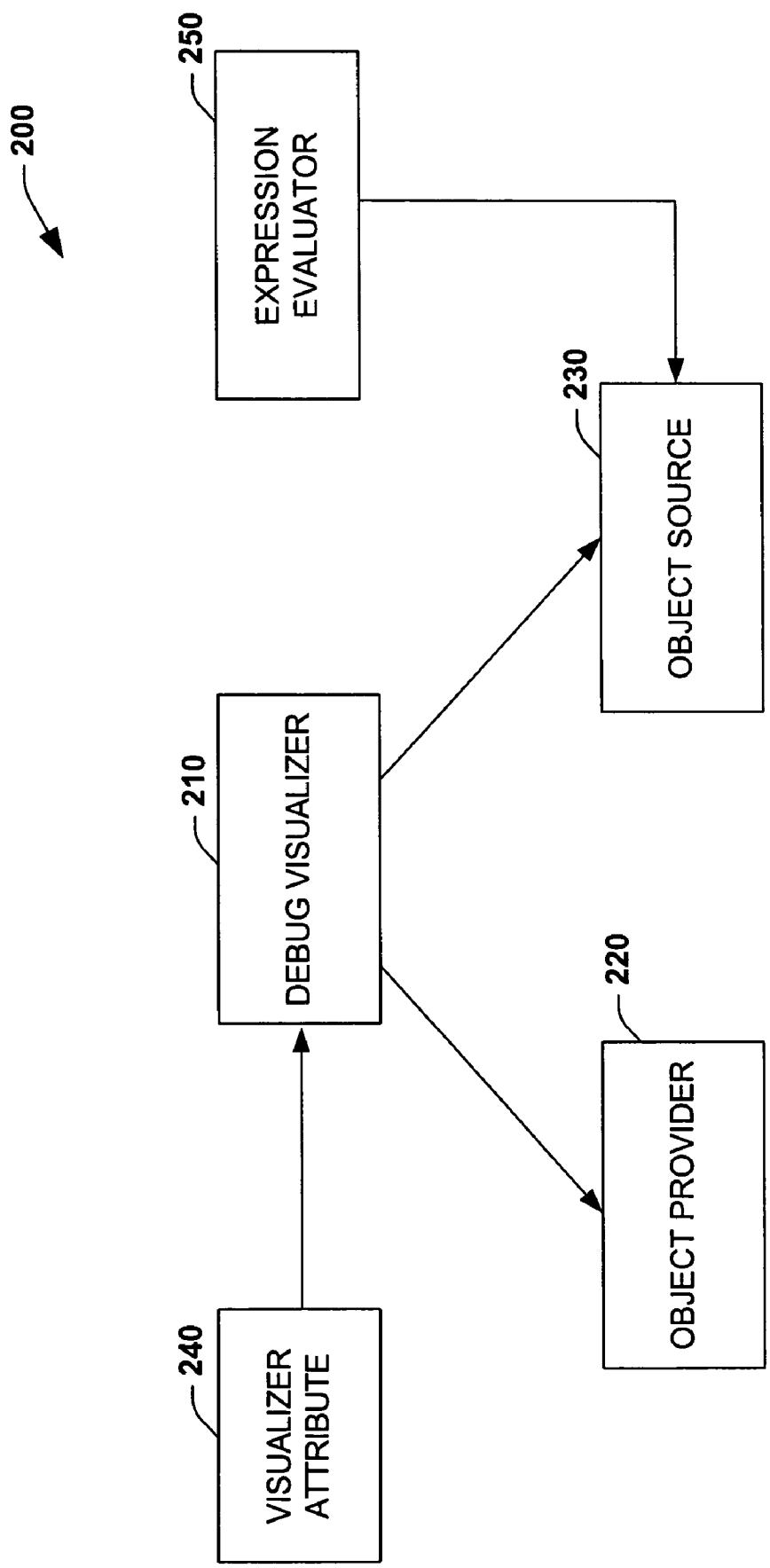
FIG. 2 is a schematic block diagram illustrating example component relationships for visualizing data and communications in accordance with an aspect of the present invention.

Referring now to FIG. 2, a system 200 illustrates example component relationships for visualizing data and communications in accordance with an, aspect of the present invention. Before proceeding, it is noted that FIGS. 2-7 describe particular example implementations for display and communications of object data. It is to be appreciated that a plurality of other implementations are also possible.

Facilitating communications in accordance with the present invention can include addition of classes and interfaces. In one example, a debug visualizer 210 (such as an IDebugVisualizer 210), an object provider 220 (such as an IVisualizerObjectProvider 220), and an object source 230

(such as a VisualizerObjectSource 230) can be provided which are described in more below detail below along with an auxiliary enumeration. IDebugVisualizer 210 can be implemented by the display component or visualizer code, and the type which implements it is the type which is specified in a DebuggerVisualizerAttribute 240. The IVisualizerObjectSource 230 can be implemented by an expression evaluator 250 though some of its functions may merely pass data through to the display serialize code. The VisualizerObjectSource 230 can be subclassed by the display serialize class which communicates the object being debugged to the visualizer or display component. VisualizerObjectSource 230 typically provides a standard binary serialization of the object which can be used instead of subclassing if custom serialization is not desired. The following code descriptions provide example implementations of the components depicted in FIG. 2.

```
/// <summary>
/// The possible types of UI that a visualizer can display.
/// </summary>
public enum VisualizerUIType { Modal, ToolWindow, DropDown };
public interface IDebugVisualizer
{
    /// <summary>
    /// Displays the visualizer.
    /// </summary>
    /// <param name="windowService">A service provider of UI services. The type UI
specified in GetVisualizerUIType is provided.</param>
    /// <param name="objectProvider">The VisualizerObjectProvider that can provide
the object data.</param>
    void Show (IServiceProvider windowService, IVisualizerObjectProvider
objectProvider, VisualizerUIType uiType);
}
/// <summary>
/// Provides object data from the debugee to the visualizer.
/// </summary>
public interface IVisualizerObjectProvider
{
    /// <summary>
    /// Specifies whether a replacement object can be created. For instance, if the object
being
    /// visualized is a readonly field then this will return false.
    /// </summary>
    /// <returns></returns>
    bool IsObjectReplaceable { get; }
    /// <summary>
    /// Gets an initial blob of data about the object being debugged. The data
    /// is written into the provided MemoryStream.
    /// </summary>
    /// <param name="dataStream">The MemoryStream in which to copy the serialized
blob of data.</param>
    void GetData (Stream dataStream);
    /// <summary>
    /// Creates a replacement copy of the object based on the serialized data given.
    /// </summary>
    /// <param name="serializedObject">Serialized version of what the new object will
be.</param>
    void ReplaceObject (Stream serializedObject);
    void UpdateObject (Stream fromVisualizer, Stream toVisualizer);
    /// <summary>
    /// Gets the data using GetData and then deserializes assuming that defualt
serialization has been done
    /// </summary>
    /// <returns></returns>
    object GetObject ( );
    /// <summary>
    /// Serializes the object using default serialization and then sets the data using
ReplaceObject
    /// </summary>
    /// <returns></returns>
    void SetObject (object o);
    event EventHandler BeginUpdate;
    event EventHandler EndUpdate;
}
/// <summary>
/// Provides access to the object being visualized.
/// Subclass this class to provide custom functionality.
/// </summary>
public class VisualizerObjectSource
{
    /// <summary>
    /// Gets a blob of data. Writes data from the object into the memorystream.
    /// </summary>
    /// <param name="o">Object being debugged.</param>
```

-continued

```
/// <param name="dataStream">MemoryStream to write data into.</param>
    public virtual void GetData (object o, Stream dataStream)
    {
        BinaryFormatter formatter = new BinaryFormatter ( );
        formatter.Serialize (dataStream, o);
    }
    /// <summary>
    /// Creates and returns a replacement object for the object passed in based on the
    /// serialized data.
    /// </summary>
    /// <param name="o">The object being debugged.</param>
    /// <param name="serializedObject">The serialized blob from the
visualizer.</param>
    /// <returns>A new object which the EE will replace <c>o</c> with.</returns>
    public virtual object ReplaceObject (object o, Stream serializedObject)
    {
        BinaryFormatter formatter = new BinaryFormatter ( );
        return formatter.Deserialize (serializedObject);
    }
    /// <summary>
    /// Called by Expression Evaluator requesting update of object being debugged.
    /// Scenario 1: Requesting more information
    ///       A predefined message passing mechanism allows fromVisualizer to be a
serialized message
    ///       containing a specific request for extra information. toVisualizer is then the
reply to
    ///       that request.
    /// Scenario 2: Writing back changes
    ///     The fromVisualizer stream is a serialized version of the modified contents of the
    ///object being debugged. This method then makes changes to the object
accordingly.
    /// </summary>
    /// <param name="o">The object being debugged.</param>
    /// <param name="fromVisualizer">Blob of information sent from
Visualizer</param>
    /// <param name="toVisualizer">Blob of information to send to Visualizer</param>
    public virtual void TransferData (object o, Stream fromVisualizer, Stream
toVisualizer)
    {
        throw new ApplicationException (String.Format ("TransferData not defined for
objects of type {0}", o.GetType ( )));
    }
}
```

Figure 3:
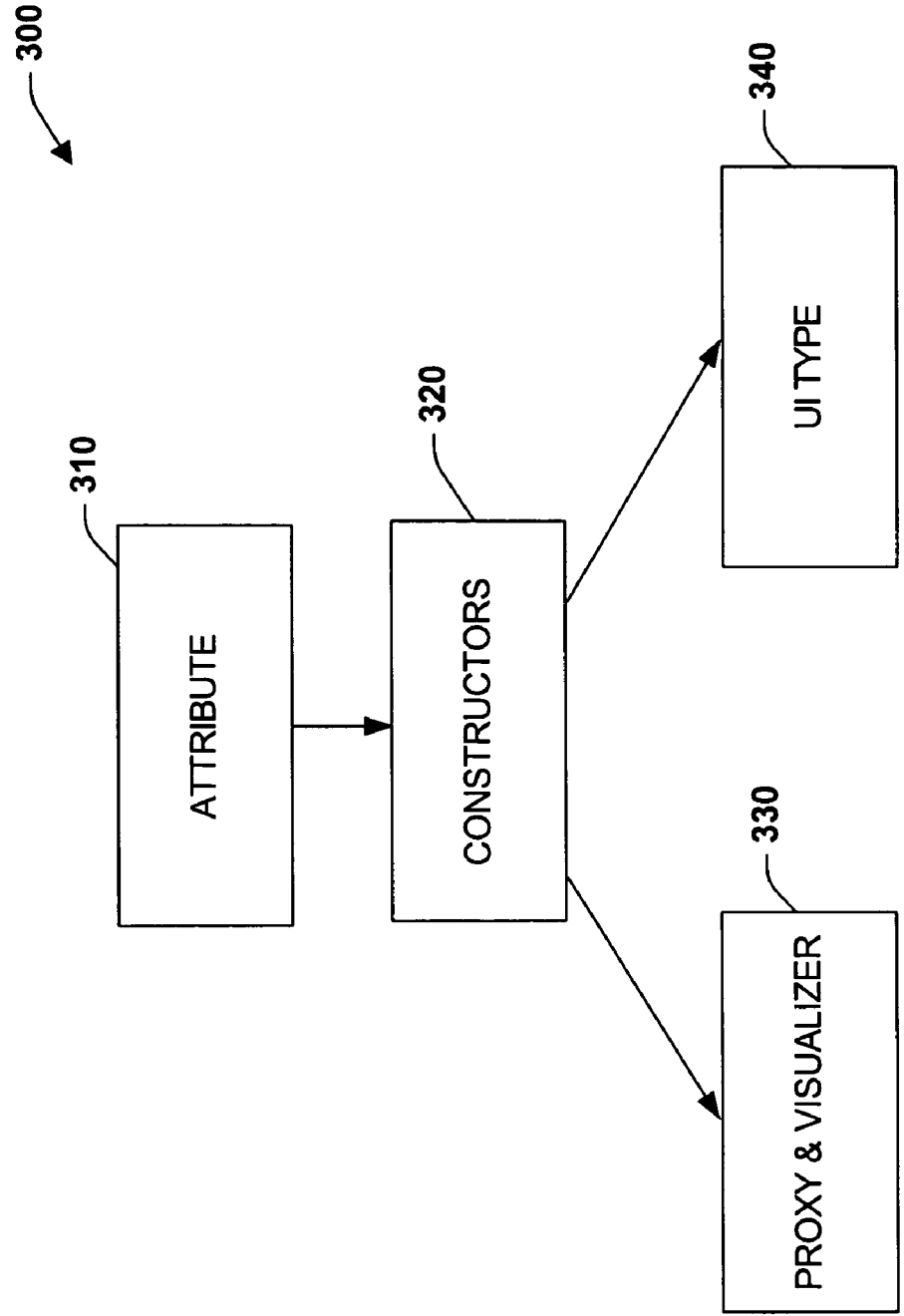
FIG. 3 is a diagram illustrating an example components for associating a visualizer with a type in accordance with an aspect of the present invention.

Turning to FIG. 3, a system 300 illustrates example components 300 for associating a visualizer with a type in accordance with an aspect of the present invention. In order to associate a visualizer with a particular type an attribute 310 defined below can be employed. The attribute 310 can be used at the assembly level on a DLL placed in a specified folder, for example. The attribute 310 has a number of constructors 320 which generally take two types and a VisualizerUIType. At 330, the two types are illustrated including a proxy which serializes the data from the debug object and a visualizer which receives and displays the serialized data. Additional constructors 320 can be provided such that a visualizer assembly does not need to be referenced by the assembly containing the DebuggerVisualizerAttribute. This allows a component creator to ship the visualizer in a 'debug time' DLL. There are also constructors 310 which do not take a DebugObjectType, and which use a default DebugObjectType implementation of the serialization behavior. A VisualizerUIType parameter 340 specifies what type of user interface the visualizer should use. This value can be passed to the visualizer's Show method. Lastly there is a named parameter Description which specifies the text that will appear in a drop-down window (or other user interface selection mechanism) when the user selects between multiple visualizers.

```
/// <summary>
/// Signifies that the attributed type has a visualizer which is pointed
/// to by the parameter type name strings.
/// </summary>
[AttributeUsage (AttributeTargets.Struct | AttributeTargets.Class |
AttributeTargets.Assembly, AllowMultiple = true)]
public sealed class DebuggerVisualizerAttribute : Attribute
{
    private string debugObjectTypeName;
    private string debugVisualizerTypeName;
    private string description;
    private VisualizerUIType uiType;
    private Type target;
    public DebuggerVisualizerAttribute (string debugObjectTypeName,
string debugVisualizerTypeName, VisualizerUIType uiType)
    {
        this.debugObjectTypeName = debugObjectTypeName;
        this.debugVisualizerTypeName = debugVisualizerTypeName;
        this.uiType = uiType;
    }
    public DebuggerVisualizerAttribute (Type debugObjectType, Type
debugVisualizerType, VisualizerUIType uiType)
    {
        this.debugObjectTypeName =
            debugObjectType.AssemblyQualifiedName;
        this.debugVisualizerTypeName =
            debugVisualizerType.AssemblyQualifiedName;
        this.uiType = uiType;
    }
```

-continued

```
    public DebuggerVisualizerAttribute (Type debugObjectType, string
debugVisualizerTypeName, VisualizerUIType type)
    {
        this.debugObjectTypeName =
        debugObjectType.AssemblyQualifiedName;
        this.debugVisualizerTypeName = debugVisualizerTypeName;
        this.uiType = uiType;
    }
    public DebuggerVisualizerAttribute (Type debugVisualizerType,
VisualizerUIType uiType)
    {
        this.debugVisualizerTypeName =
debugVisualizerType.AssemblyQualifiedName;
        this.uiType = uiType;
    }
    public DebuggerVisualizerAttribute (string
debugVisualizerTypeName, VisualizerUIType uiType)
    {
        this.debugVisualizerTypeName = debugVisualizerTypeName;
        this.uiType = uiType;
    }
    public VisualizerUIType UIType
    {
        get { return uiType; }
    }
    public string DebugObjectTypeName
    {
        get { return debugObjectTypeName; }
    }
    public string DebugVisualizerTypeName
    {
        get { return debugVisualizerTypeName; }
    }
    public string Description
    {
        get { return description; }
        set { description = value; }
    }
    public Type Target
    {
        get { return target; }
        set { target = value; }
    }
}
```

Figure 4:
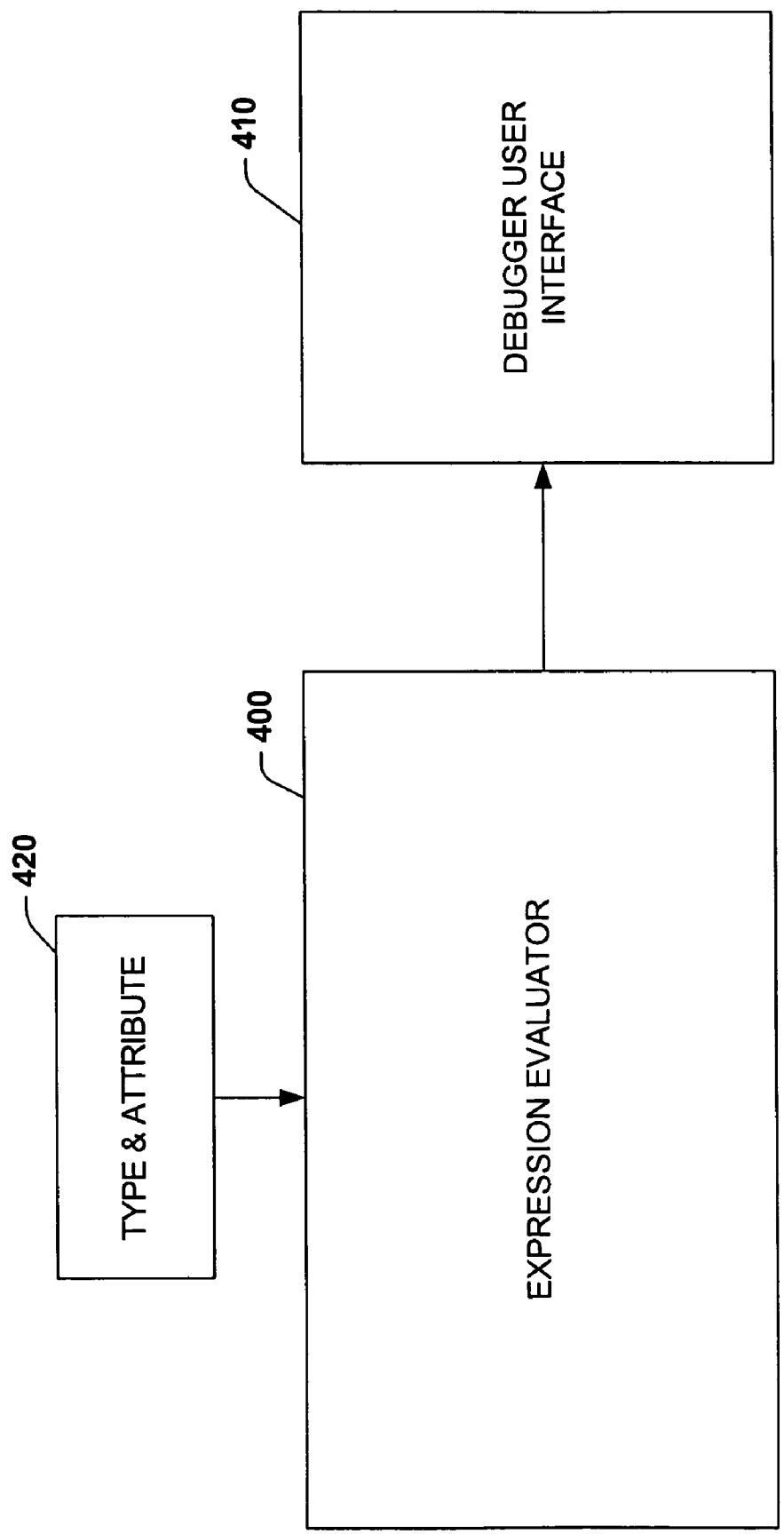
FIG. 4 illustrates an expression evaluator in accordance with an aspect of the present invention.

FIG. 4 illustrates an expression evaluator 400 in accordance with an aspect of the present invention. When the expression evaluator 400 (EE) encounters a type which has the DebuggerVisualizerAttribute on it, the EE informs a debugger user interface 410 (UI). The UI 410 provides the user a manner in which they can 'activate' the visualizer. It is noted that a single type can have multiple visualizers. After the user selects the visualizer they'd like to use, the expression evaluator 400 loads the VisualizerObjectSource and IDebugVisualizer specified in the DebggerVisualizerAttribute at 420 described above. In loading these types 420, the EE 400 may need to load assemblies that the assembly qualified type names reference. It then verifies that these types implement the correct interfaces. If so, it generally creates instances of each type.

The IDebugVisualizer can be loaded into a new AppDomain in the debugger process, and the VisualizerObjectSource can be loaded into the debuggee process. Next it will call a Show( ) method on the type which implements IDebugVisualizer, passing it an instance of IVisualizerObjectProvider and the VisualizerUIType from the DebuggerVisualizerAttribute. The implementation of IVisualizerObjectProvider passed to Show( ) method forwards many of its calls to the instance of VisualizerObjectSource that it created.

It is possible to place attributes on types for the purposes of display even if the source code for the types are not available. This is achieved by creating an assembly which has a set of assembly level attributes (the same attributes that would have originally been placed on the types) which have an additional named parameter called Target. Target merely takes the type on which to apply the attribute. Previously, customizations to data windows of the debugger were stored in a dat file, per expression evaluator. In this scheme, the debugger loads assemblies from a specific cached directory. Upon installation of a code debug component, a directory can be created in the user's documents location and then checked for DLLs at debug-time: e.g., c:\Documents and Settings\<username>\My Documents\Visual Studio\Visualizers If an attribute is specified in this directory, it generally takes precedence over an attribute defined directly on the type.

One implementation uses a caching mechanism such that an assembly can be copied into the directory and the attributes is loaded; however, the caching mechanism facilitates that each assembly does not need to be opened and searched for metadata when a debug session is started. Instead a trivial check can be performed to determine that the current directory matches the last cached state; assuming it does then only the cache is used to determine whether an attribute on a particular type is present. If it does not, then the cache is rebuilt.

In the steps that the EE 400 performs to find the visualizer, a number of errors can be encountered. These are:

The specified debugObject type cannot be found

The specified debugVisualizer type cannot be found

The specified debugObject type does not extend VisualizerObjectSource

The specified debugVisualizer type does not extend IDebugVisualizer

The DebugVisualizer.Show( ) method fails with an exception

In cases 1-4 a standard error dialog can be displayed. In case 5, the EE 400 can catch the exception thrown in the Show method and display it as an error.

Figure 5:
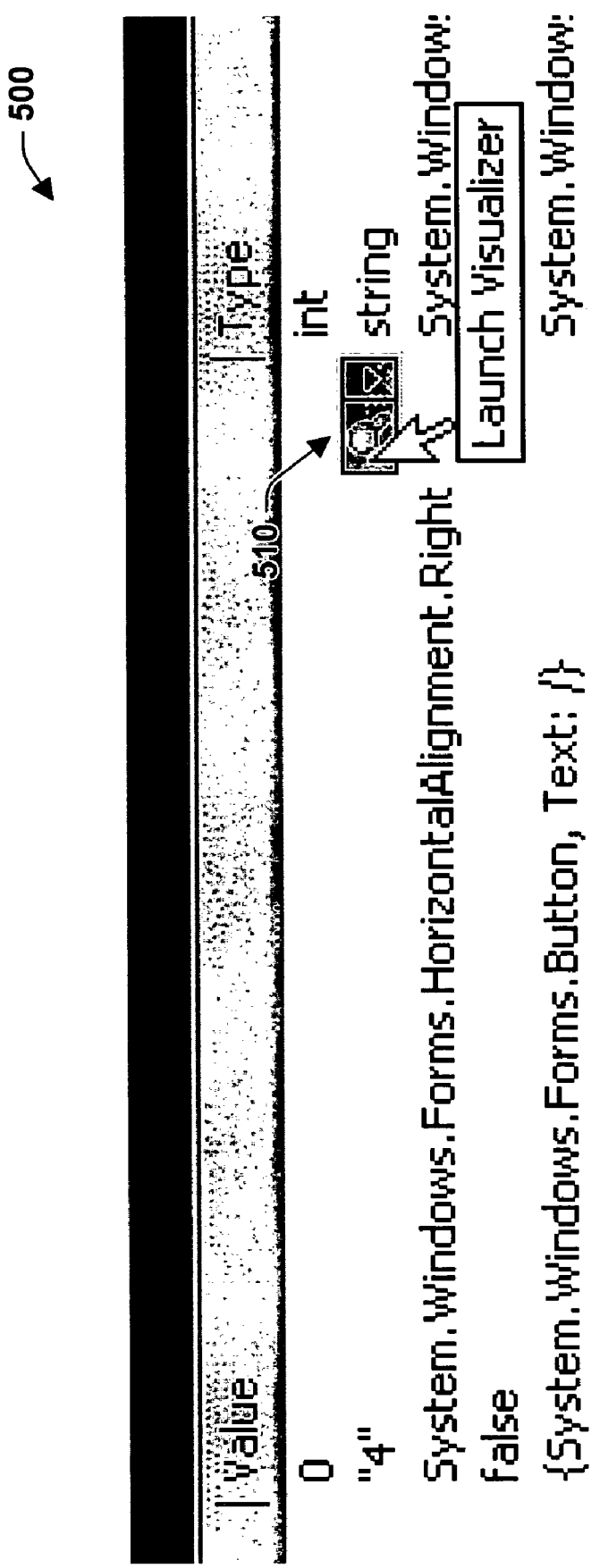
FIG. 5 illustrates an example interface for exposing debug visualizers in accordance with an aspect of the present invention.

FIG. 5 illustrates an example interface 500 for exposing debug visualizers in accordance with an aspect of the present invention. In general, an Integrated Development Environment (IDE) can expose debugger visualizers through a drop-down list or magnifying glass button, for example, in a value column of a data window which is illustrated at 510. The same buttons can also be available in "data tips" provided when the user hovers over values in the displayed code. If the expression evaluator determines that there are any visualizers for an object, then the display 510 can appear, for example. The button on the left at 510 can launch the last-used visualizer for the type, and the drop down on the right can show a list of available visualizers. If there is no last-used visualizer, then the dropdown can be shown upon first click of the magnifier, for example. The last-used visualizer can be persisted between debug sessions, per user, per type, for example.

Figure 6:
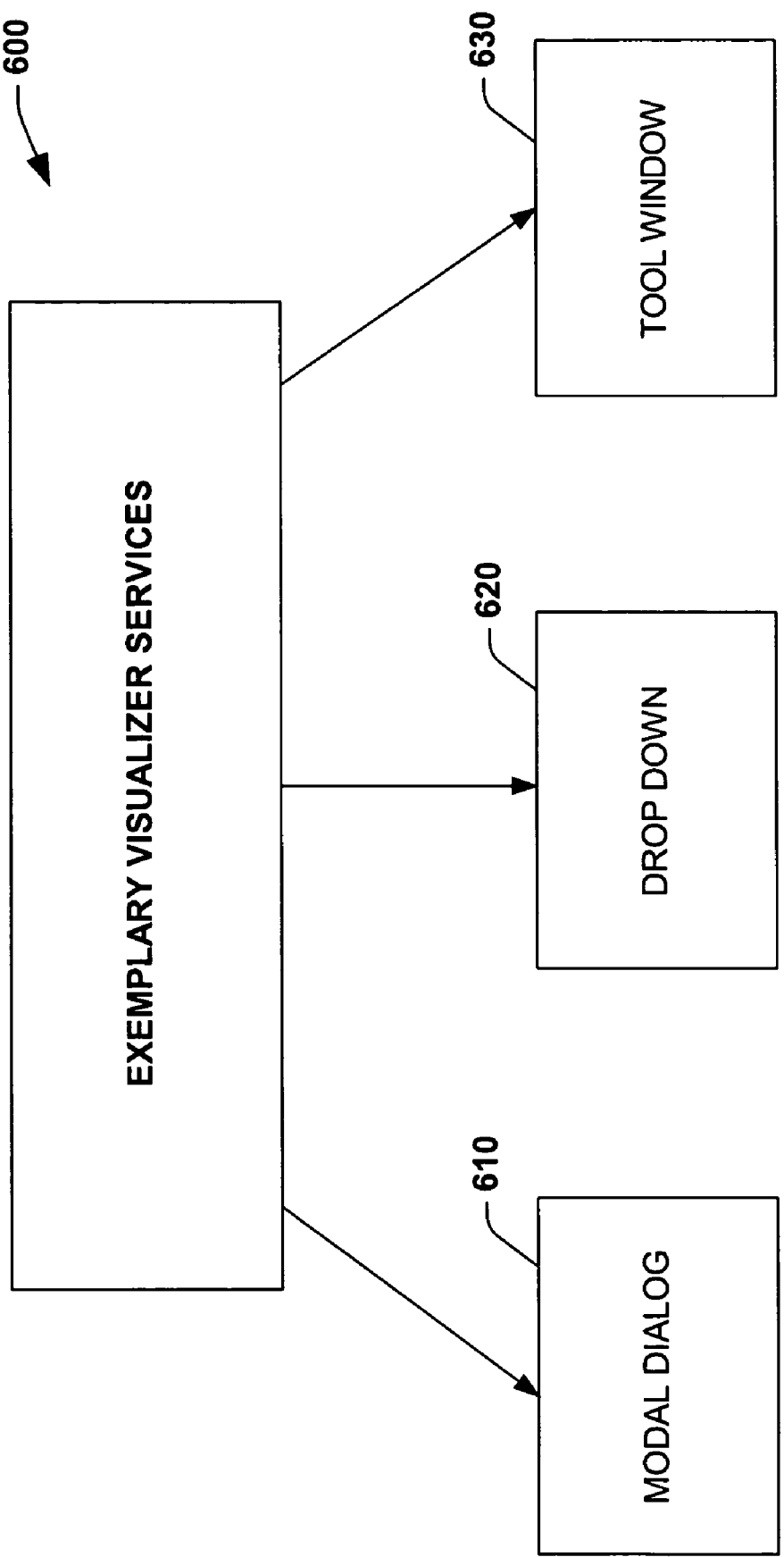
FIG. 6 illustrates exemplary visualizer services in accordance with an aspect of the present invention.

FIG. 6 illustrates exemplary visualizer services 600 in accordance with an aspect of the present invention. After the visualizer is invoked, the UI that appears is generally determined by the developer of the visualizer. It may be restricted in that they will be able to use the type of UI that is provided to them through the IServiceProvider passed to the Show( ) method of the visualizer. There are typically at least three services that could be provided, depending on what the attribute requests:

```
/// <summary>
/// An interface for each of the services that can be provided.
/// Note: These may be abstracted to allow other methods
/// </summary>
public interface IModalDialogVisualizerService
{
    /// <summary>
    ///
    /// </summary>
    /// <param name="form"></param>
    /// <returns></returns>
    DialogResult ShowDialog (Form form);
    DialogResult ShowDialog (Control control);
}
public interface IDropDownVisualizerService
{
    /// <summary>
    ///
    /// </summary>
    /// <param name="control"></param>
    void ShowDropDown (Control control);
    void CloseDropDown ( );
}
public interface IToolWindowVisualizerService
{
    /// <summary>
    ///
    /// </summary>
    /// <param name="control"></param>
    void ShowToolwindow (Control control);
    void CloseToolWindow ( );
}
```

The services 600 provide the ability to display the type of UI that was requested by the attribute. In a modal dialog case 610, the user can provide a form which can be displayed as a modal dialog, or they can provide a Control which can be hosted in a form and displayed as a dialog. In a Drop Down case 620, the visualizer developer provides a control which can be hosted in the drop down. They can also programmatically close the dropdown if desired. They also apply to a modeless case, except that the control can be hosted in a modeless window illustrated at 630.

Figure 7:
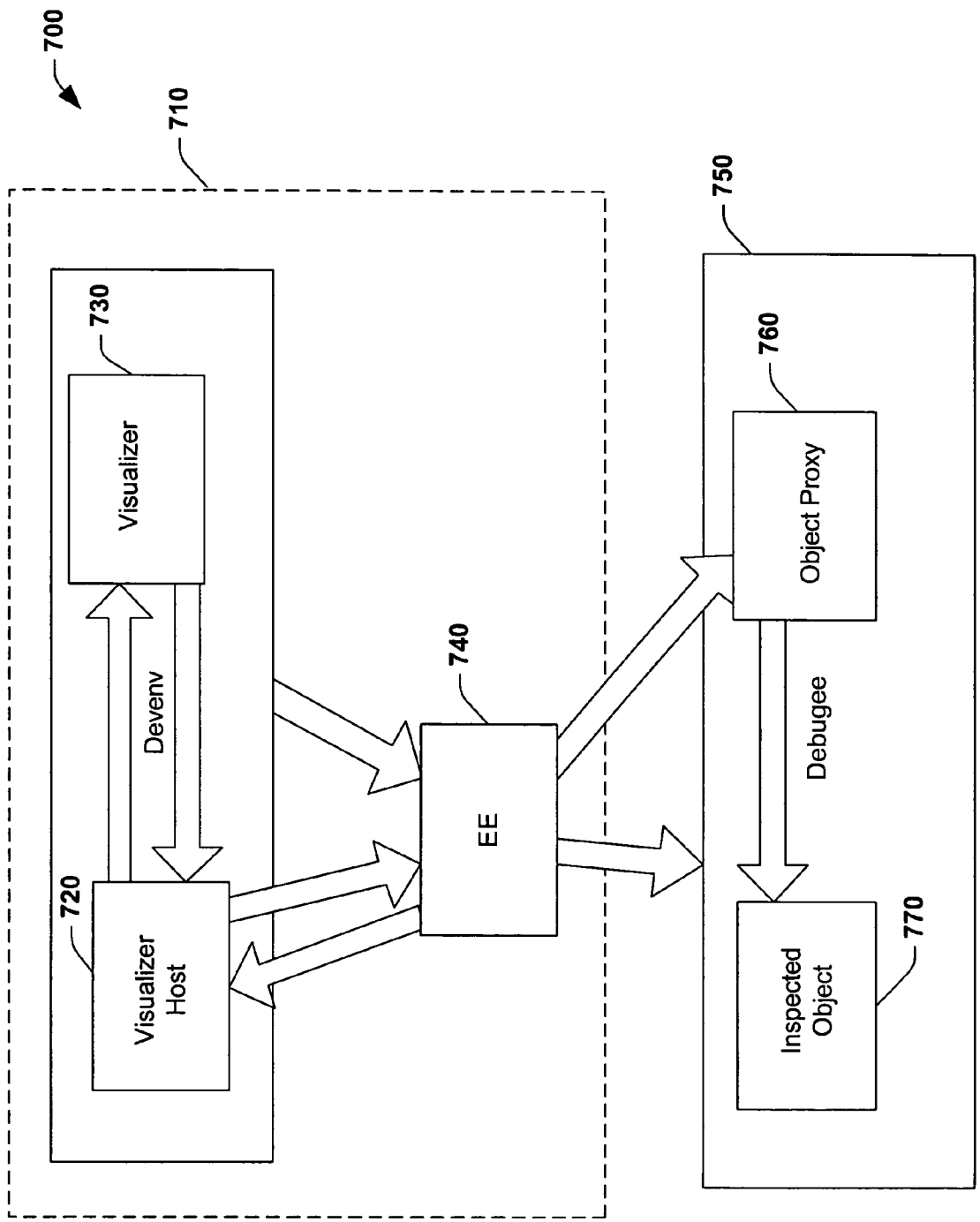
FIG. 7 illustrates exemplary component communications in accordance with an aspect of the present invention.

FIG. 7 illustrates exemplary component communications 700 in accordance with an aspect of the present invention. A code debug component 710 includes a visualizer host 720, a visualizer 730, and an expression evaluator 740 (EE). The debug component 710 communicates with a debug object 750 including an object proxy 760 and an object under inspection 770. In general, communications begins from the visualizer host 720 to the expression evaluator 740 which then establishes communications with the debug object 750 via the object proxy 760. The EE 740 responds to the visualizer host 720 which loads the visualizer 730 which in turns directs communications back through the visualizer host 720, through the EE 740, to the object proxy 760 and to the object under inspection at 770. In this manner, the object proxy 760, and the visualizer 730 cooperate to present data from the debug object 750 in a desired format.

Figure 8:
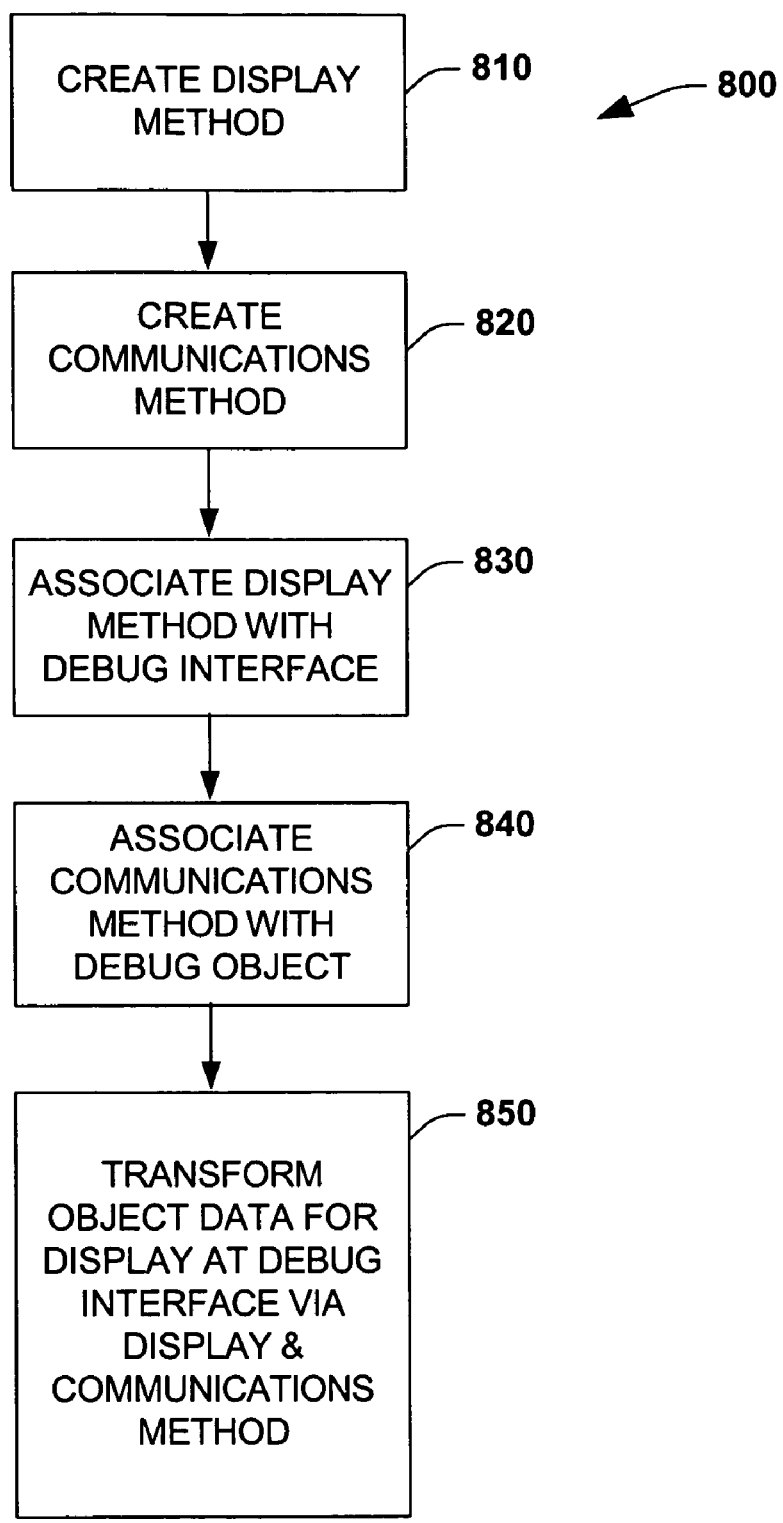
FIG. 8 is a flow diagram of a debug visualization and communications methodology in accordance with an aspect of the present invention.

FIG. 8 is a process 800 illustrating a debug visualization and communications methodology in accordance with an aspect of the present invention. While, for purposes of simplicity of explanation, the methodology is shown and described as a series or number of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 810, a display method is created. As noted above, this can include associating a visualizer or other display component with a code debug environment to present object representations of data in a desired format. At 820, a communications method is created. As previously noted, this can include the creation of an object proxy that serializes object data, for example, for display. At 830, the display method is associated with a debug interface. This can include loading the display method from the object under debug or from another source than the object. At 840, the communications method is associated with the debug object. This can include providing serialization code to transmit/object data to a respective visualization or display component at the debug interface. At 850, object data is transformed from one representation in the object to a display representation in a code debug environment via cooperation and communications between the communications method and the display method.

Figure 9:
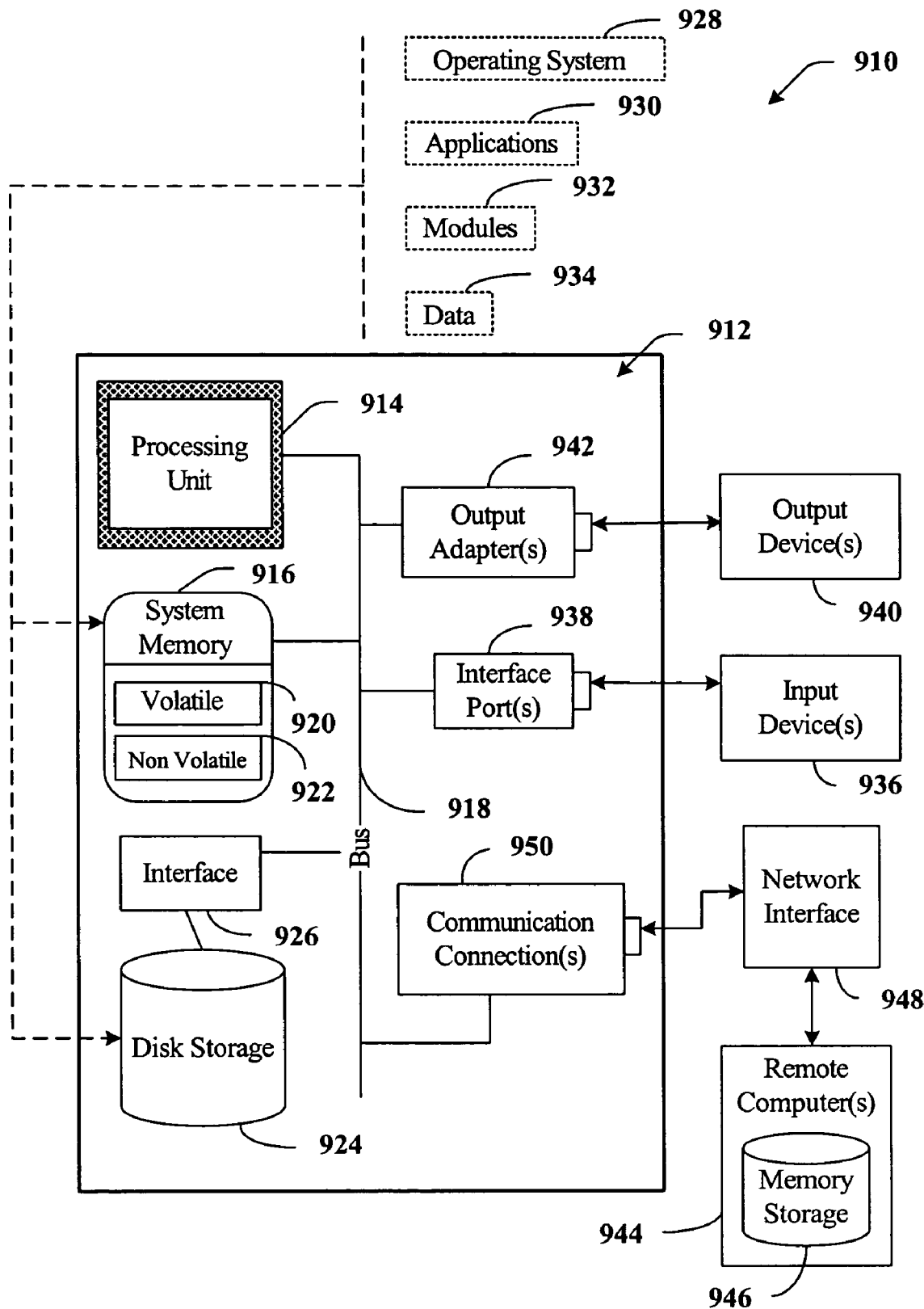
FIG. 9 is a schematic block diagram illustrating a suitable operating environment in accordance with an aspect of the present invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
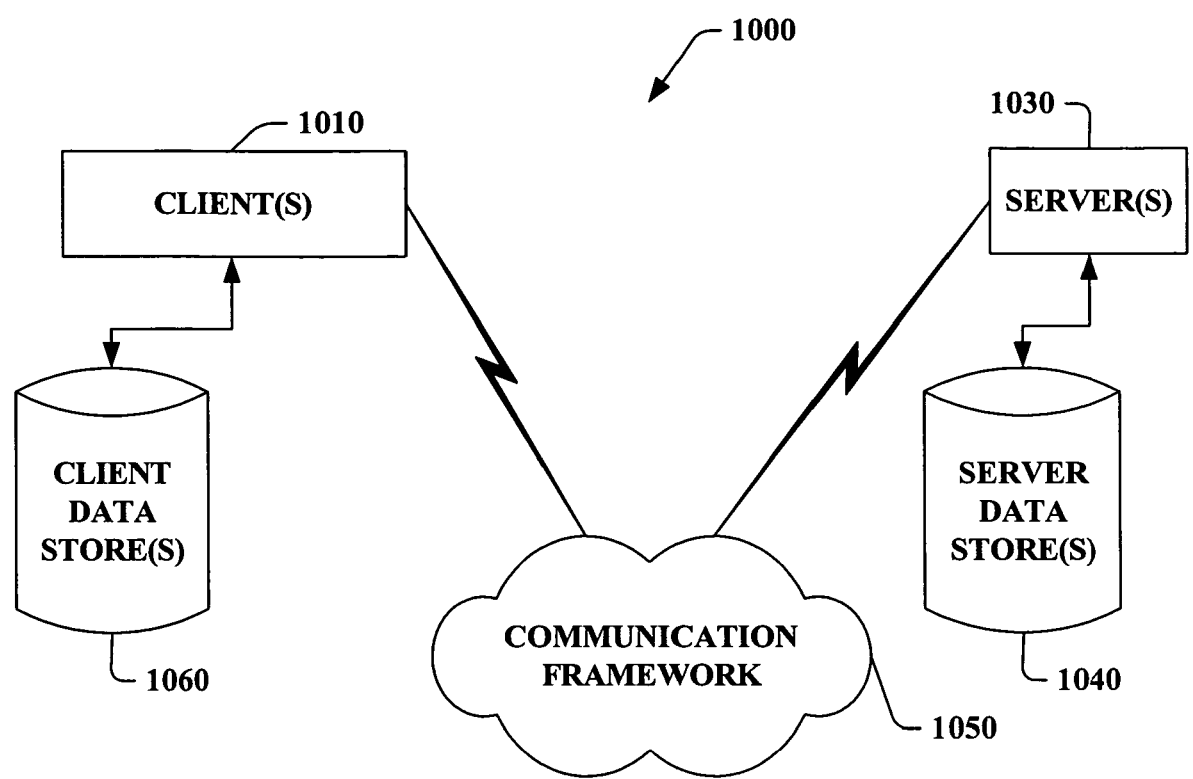
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A debugging system for debugging objects, comprising:
   a processor;
   system memory;
   one or more computer storage media having stored thereon computer-executable instructions representing a code debug component, an expression evaluator, a bit map object containing image data for an image, and a plurality of visualizers defining debug time presentation formats for corresponding objects, the code debug component having a binary data format for representing object data that is being debugged, the code debug component having a graphical user interface for interacting with objects that are being debugged at the code debug component, the bit map object containing a type that has a visualizer attribute on it, wherein the debugging system is configured to:
   run the code debug component in a debugger process; and
   run the bit map object in a debuggee process;
   wherein the expression evaluator is configured to access the bit map object;
      determine that the bit map object is of a type that has a visualizer attribute on it; and
      inform the code debug component that the bit map object is of a type that has a visualizer attribute on it;
   wherein the code debug component is configured to:
      expose a plurality of available visualizers for the bit map object through the graphical user interface in response to being informed that the bit map object is of a type that has a visualizer attribute on it;
receive a selection of a specified visualizer from among the exposed plurality of available visualizers for the bit map object;
wherein the debugging system is further configured to:
load the specified visualizer into a new application domain in the debugger process;
load a visualizer object representing the bit map object into the debuggee process;
establish communication between the specified visualizer and the visualizer object; and
pass an instance of the visualizer object to the code debug component in the binary data format; and
wherein the code debug component is further configured to:
receive the instance of the visualizer object in the binary format at the specified visualizer;
convert the visualizer object from the binary format to an image data format at the specified visualizer; and
present the visualizer object in accordance with the image data format to represent the contents of the bit map image at the graphical user interface.

2. The system of claim 1, wherein the specified visualizer is loaded from the bit map object to the new application domain in the debugger process.

3. The system of claim 1, wherein the specified visualizer is associated with a portion of a display to enable selection of a desired viewing format.

4. The system of claim 1, wherein the visualizer object is a serializer that transmits streams of data from the debug object to the display component.

5. The system of claim 1, further comprising at least one constructor to facilitate communications between the specified visualizer and the visualizer object.

6. The system of claim 1, further comprising providing an icon to expose the plurality of visualizers.

7. The system of claim 6, the icon including at least one of a display object to launch a last used visualizer or a selection item to display a list of visualizers, the list of visualizers determined by the visualizer attribute.

8. The system of claim 6, further comprising providing selection options as data tips when a user hovers over values in a code.

9. The system of claim 1, further comprising a service component associated with the visualizer, the service component including at least one of a modal dialog, a drop down list, and a tool window.

10. At a debugging system for debugging objects, the debugging system including a processor and system memory, the debugging system also including a code debug component, an expression evaluator, and a plurality of visualizers, the code debug component including a graphical user interface for interacting with objects that are being debugged at the code debug component, the code debug component having a binary format for representing object data that is being debugged, the plurality of visualizers defining debug time presentation formats for corresponding objects, a method for displaying data for a bit map object that is being debugged, the method comprising:
running the code debug component in a debugger process;
running the bit map object in a debuggee process;
the expression evaluator accessing the bit map object;
the expression evaluator determining that the bit map object is of a type that has a visualizer attribute on it;
the expression evaluator informing the code debug component that the bit main object is of a type that has a visualizer attribute on it;
the code debug component exposing a plurality of available visualizers for the bit map object through the graphical user interface in response to being informed that the bit map object is of a type that has a visualizer attribute on it;
the code debug component receiving a selection of a specified visualizer from among the exposed plurality of available visualizers for the bit map object;
loading the specified visualizer into a new application domain in the debugger process;
loading a visualizer object representing the bit map object into the debuggee process;
establishing communication between the specified visualizer and the visualizer object;
passing an instance of the visualizer object to the code debug component in the binary data format;
the code debug component receiving the instance of the visualizer object in the binary format at the specified visualizer;
the code debug component converting the visualizer object from the binary format to an image data format at the specified visualizer; and
the code debug component presenting the visualizer object in accordance with the image data format to represent the contents of the bit map image at the graphical user interface.

11. The method of claim 10, wherein the visualizer object is a serializer that transmits streams of data from the debug object to the display component.

12. The method as recited in claim 11, wherein a transmitted stream of data comprises one or more of extensible markup language (XML) data and string data.

13. The method of claim 10, wherein exposing a plurality of available visualizers comprises providing an icon including at least one of a display object to launch a last used visualizer or a selection item to display a list of visualizers, the list of visualizers determined by the visualizer attribute.

14. The method of claim 10, further comprising providing selection options as data tips when a user hovers over values in a code.

15. A computer program product for use at a debugging system for debugging objects, the debugging system including a code debug component, an expression evaluator, and a plurality of visualizers, the code debug component including a graphical user interface for interacting with objects that are being debugged at the code debug component, the code debug component having a binary format for representing object data that is being debugged, the plurality of visualizers defining debug time presentation formats for corresponding objects, the computer program product for implementing a method for displaying data for a bit map object that is being debugged, the computer program product comprising one or more computer storage media having stored thereon computer-executable instructions that, when executed at a processor, cause the computer system to perform the method, including the following:
run the code debug component in a debugger process;
run the bit map object in a debuggee process;
at the expression evaluator access the bit map object;
at the expression evaluator determine that the bit map object is of a type that has a visualizer attribute on it;
at the expression evaluator inform the code debug component that the bit map object is of a type that has a visualizer attribute on it;

at the code debug component expose a plurality of available visualizers for the bit map object through the graphical user interface in response to being informed that the bit map object is of a type that has a visualizer attribute on it;

at the code debug component receive a selection of a specified visualizer from among the exposed plurality of available visualizers for the bit map object;

load the specified visualizer into a new application domain in the debugger process;

load a visualizer object representing the bit map object into the debuggee process;

establish communication between the specified visualizer and the visualizer object;

pass an instance of the visualizer object to the code debug component in the binary data format;

at the code debug component receive the instance of the visualizer object in the binary format at the specified visualizer;

at the code debug component convert the visualizer object from the binary format to an image data format at the specified visualizer; and at the code debug component present the visualizer object in accordance with the image data format to represent the contents of the bit map image at the graphical user interface.

* * * * *